US006438513B1

(12) United States Patent
Pastor et al.

(10) Patent No.: US 6,438,513 B1
(45) Date of Patent: Aug. 20, 2002

(54) PROCESS FOR SEARCHING FOR A NOISE MODEL IN NOISY AUDIO SIGNALS

(75) Inventors: Dominique Pastor, Hengelo (NL); Gérard Reynaud, Bordeaux (FR)

(73) Assignee: Sextant Avionique, Velizy Villacoublay (FR)

( * ) Notice: Subject to any disclaimer, the term of this patent is extended or adjusted under 35 U.S.C. 154(b) by 0 days.

(21) Appl. No.: 09/446,886

(22) PCT Filed: Jul. 3, 1998

(86) PCT No.: PCT/FR98/01428

§ 371 (c)(1),
(2), (4) Date: Dec. 30, 1999

(87) PCT Pub. No.: WO99/01862

PCT Pub. Date: Jan. 14, 1999

(30) Foreign Application Priority Data

Jul. 4, 1997 (FR) ............................................ 97 08509

(51) Int. Cl.[7] ................................................. G06F 3/16
(52) U.S. Cl. ........................... 702/191; 702/66; 702/77
(58) Field of Search ................................ 704/246, 233, 704/253; 702/66, 77, 191; 381/94.7; 364/574, 572; 395/2.35

(56) References Cited

U.S. PATENT DOCUMENTS

| | | | | | |
|---|---|---|---|---|---|
| 5,029,118 | A | * | 7/1991 | Nakajima et al. | 364/572 |
| 5,337,251 | A | | 8/1994 | Pastor | 364/484 |
| 5,511,009 | A | | 4/1996 | Pastor | 364/572 |
| 5,521,851 | A | * | 5/1996 | Wei et al. | 364/574 |
| 5,572,623 | A | | 11/1996 | Pastor | 395/2.42 |
| 5,687,285 | A | * | 11/1997 | Katayanagi et al. | 395/2.35 |
| 5,727,073 | A | * | 3/1998 | Ikeda | 381/94.7 |
| 5,752,226 | A | * | 5/1998 | Chan et al. | 704/233 |
| 5,987,142 | A | | 11/1999 | Courneau et al. | 381/17 |
| 6,108,610 | A | * | 8/2000 | Winn | 702/77 |
| 6,144,937 | A | * | 11/2000 | Ali | 704/233 |
| 6,182,018 | B1 | * | 1/2001 | Tran et al. | 702/66 |
| 6,188,981 | B1 | * | 2/2001 | Benyassine et al. | 704/233 |
| 6,216,103 | B1 | * | 4/2001 | Wu et al. | 704/253 |
| 6,289,309 | B1 | * | 9/2001 | deVries | 704/233 |
| 6,308,153 | B1 | * | 10/2001 | Huang et al. | 704/246 |
| 6,314,395 | B1 | * | 11/2001 | Chen | 704/233 |

* cited by examiner

*Primary Examiner*—Marc S. Hoff
*Assistant Examiner*—Felix Suarez
(74) *Attorney, Agent, or Firm*—Oblon, Spivak, McClelland, Maier & Neustadt, P.C.

(57) ABSTRACT

A process for the denoising of audio signals picked up in a noisy environment, for example in the cockpit of an aircraft or of another vehicle, and more precisely to the searching for a noise model in the audio signals. Input signals are digitized, and these signals are processed on the basis of a noise model, in principle with a view to eliminate as far as possible the noise corresponding to the model. The input signals are chopped into successive frames of P samples each, and a repetitive search for a noise model is performed continuously in the input signals themselves, by searching for N successive frames (N lying between a minimum N1 and a maximum N2) having the expected characteristics of a noise, by storing N×P corresponding samples so as to construct a noise model useful in the denoising processing of the input signals and by iteratively repeating the search so as to find a new noise model and to store the new noise model as a replacement for the previously stored noise mode or to retain the previously stored noise model according to the respective characteristics of the two models. The model is obtained by finding N frames whose energies are close to one another (ratio of energies lying between two values S and 1/S).

16 Claims, 4 Drawing Sheets

PROCESS FOR SEARCHING FOR A NOISE MODEL IN NOISY AUDIO SIGNALS

BACKGROUND OF THE INVENTION

1. Field of the Invention

The invention relates to the improving of the intelligibility of voice communications in the presence of noise. It applies more especially but not exclusively to telephone or radiotelephone communications or those by other electronic means, to voice recognition, etc. whenever the environment of the sound capture is noisy and might perhaps impair the perception or recognition of the voice transmitted.

2. Discussion of the Background

An example thereof may be given with regard to voice communications inside an aircraft or another noisy vehicle. In the case of an aircraft, noise results from the engines, from the air-conditioning, from the ventilation for the on-board equipment, from aerodynamic noise. All this noise is picked up by the microphone into which the pilot or a crew member is speaking.

SUMMARY OF THE INVENTION

The invention proposes a process for searching for a noise model which can serve in particular in noise reduction processing. Noise reduction processing based on the noise model found makes it possible to increase the signal/noise ratio of the signal transmitted, one goal being to impair the intelligibility of the signal as little as possible. In this patent application, the neologisms denoising and denoise will be used to speak of operations aimed at removing or reducing noise components present in the signal.

Denoising may be based as will be seen on the continuous search for an environmental noise model, on the digital spectral analysis of this noise, and on the digital reconstruction of a useful signal which eliminates the modelled noise as far as possible.

The noise model is searched for in the noisy signals themselves and, whenever a plausible noise model has been found, this noise model is stored so as to be able to be used. Then, a new search starts in order to find a more suitable or simply a more recent model.

More precisely, the invention proposes a process for automatically searching for noise models in noisy audio input signals, in which the input signals are digitized, and these signals are processed on the basis of a model found (for example with a view to eliminating as far as possible the noise corresponding to the model), characterized in that the input signals are chopped into successive frames of P samples each, and a repetitive search for a noise model is performed continuously in the input signals themselves, by searching for N successive frames having the expected characteristics of a noise, by storing the N×P corresponding samples so as to construct a noise model useful in the denoising processing of the input signals and by iteratively repeating the search so as to find a new noise model and store the new model as replacement for the previous one or retain the previous model according to the respective characteristics of the two models.

Accordingly, the noise model serving in particular for denoising is not a known predetermined model or a model chosen from several predetermined models, but is a model found in the noisy signal itself, this making it possible not only to adapt the denoising to the actual nuisance noise, but also to adapt the denoislng to the variations in this noise.

The noise model is obtained by regarding the signals whose energy is stable (and, preferably, as will be seen, whose energy is a minimum) over a certain duration as probably representing noise; the search for a noise model then comprises the search for N successive frames whose energies are close to one another (N lying between a minimum value N1 and a maximum value N2), the calculation of the average energy of the N successive frames found, and the storing of the N×P samples in the guise of new active model if the ratio between this average energy and the average energy of the frames of the active model previously stored is less than a determined replacement threshold.

The search for N successive frames then comprises at least the following iterative steps: calculation of the energy of a current frame of rank n able to be appended to a model undergoing formulation already comprising n−1 successive frames; calculation of the ratio between this energy and the energy of the previous frame of rank n−1 (and preferably that of other previous frames between 1 and n−1); comparison of this ratio with a low threshold less than 1 and a high threshold greater than 1; and decision regarding the possibility of incorporating the frame of rank n into the model undergoing formulation; the frame is not incorporated into the model if the ratio does not lie between the two thresholds; it is incorporated into the model if the ratio does lie between the two thresholds. The procedure is iteratively repeated on the next current frame of the input signals, with incrementation of n, until the halting of the formulation of the model.

The formulation of the model is halted either in the case where n reaches the high value N2, or in the case where the frame of rank n is not incorporated into the model because the calculated energy ratio departs from the prescribed range. In this latter case, the formulated model cannot be taken into account as active model unless n−1 is already greater than or equal to the minimum N1, since the principle is that a noise model is representative if it has an almost stable energy over at least N1 frames.

Preferably, the formulated model does not become active in place of the previous model unless the ratio between its average energy per frame and the average energy of the previous model does not exceed a predetermined replacement threshold.

In all cases, the search for a new model restarts as soon as the formulation of the previous one is interrupted.

Finally, preferably, provision may be made for the replacement of a previous model by a new model to be disabled as soon as speech is detected in the noisy signals. The presence of speech can in fact be detected by digital signal processing procedures (such as those which can be used in speech recognition).

BRIEF DESCRIPTION OF THE DRAWINGS

Other characteristics and advantages of the invention will become apparent on reading the detailed description which follows and which is given with reference to the appended drawings in which.

DESCRIPTION OF THE PREFERRED EMBODIMENTS

In speech analysis, it is usual to regard the steady regimes of sound production as being established over durations of between 10 and 20 milliseconds.

The signals analysis which allows denoising will rely on the spectral analysis of the signals in time intervals of duration D, which will be referred to as "frames", and which will have almost this duration.

Each frame will contain $P=2^P$ samples of digitized signal, the number P depending on the frequency of sampling of the processed signal, so that the frame has a duration of the order of 10 to 20 ms regardless of the sampling frequency $F_e=1/T_e$. For example, for a sampling frequency of 10 kHz, the frame will contain P=128 samples (p=7) and will last a duration of 12.8 ms.

Figure 1:
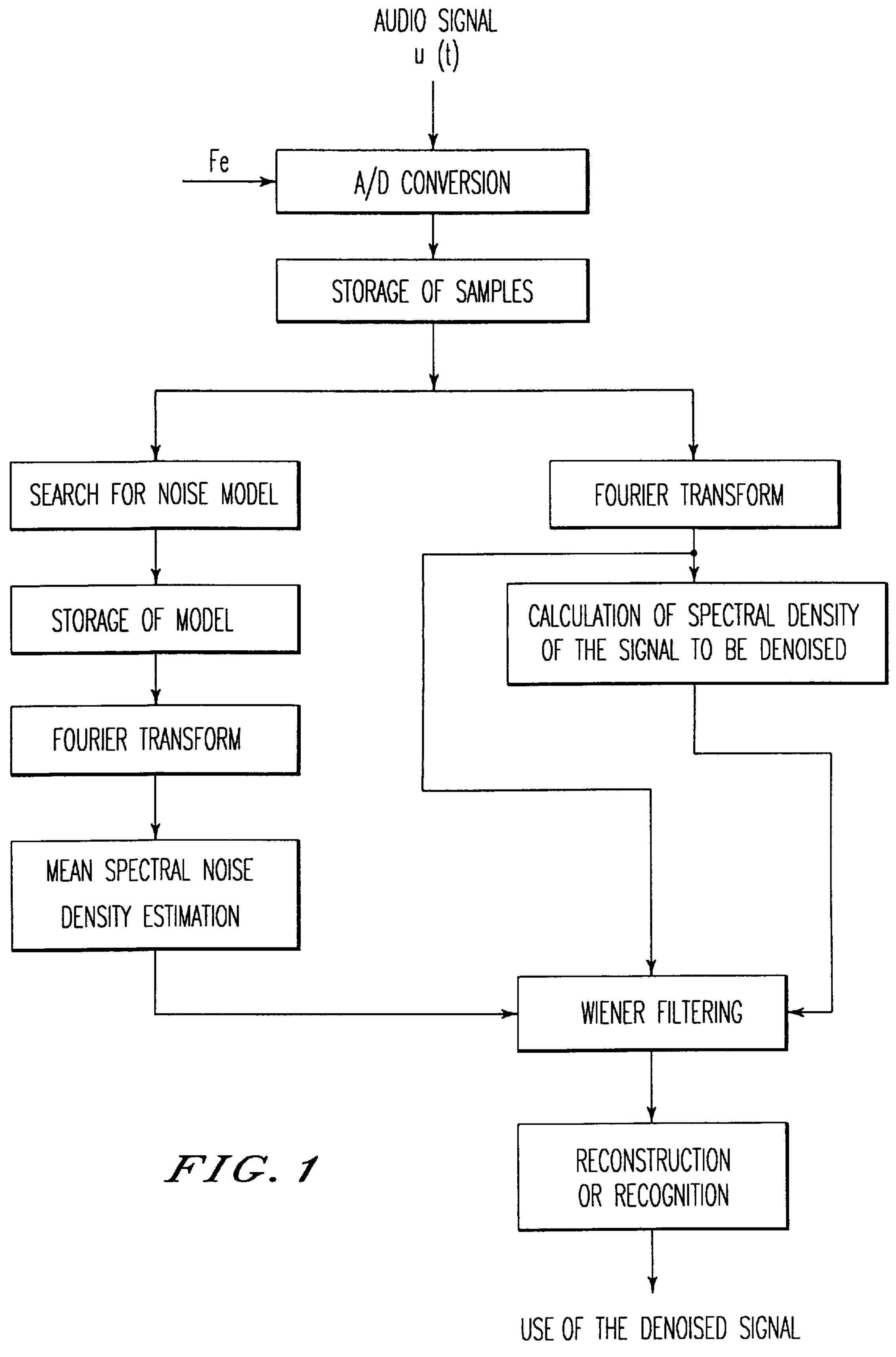
FIG. 1 represents a general flowchart of a noise reduction process using the process of the invention.

The diagram of FIG. 1 is a flowchart explaining the general principle of the denoising process.

The input signal to be processed, emanating for example from a microphone, is denoted u(t) , with a useful part s(t) and an unwanted noise b(t), with u(t)=s(t)+b(t) , the time t being assumed to be discrete ($t=kT_e$) since the signal is sampled before being digitized in an analog/digital converter.

In what follows, the processing of the input signals will be regarded, by way of example representing the main application of the invention, as a denoising processing based on the noise model found. Other applications may be envisaged (search for sibilants or palato-alveolar fricatives, for example).

The general principle of the denoising process relies on a continuous and automatic search for a noise model which will serve to process the input signal in order to denoise it. This search is carried out on the digitized signal samples u(t) stored in a buffer input memory. This memory is capable of simultaneously storing all the samples of several frames of the input signal (for example at least 2 frames).

The noise model sought consists of a succession of several frames whose energy stability and relative energy level lead one to believe that environmental noise is involved rather than a speech signal or some other disturbing noise. The manner in which this automatic search is carried out will be seen hereinafter.

When a noise model is found, all the samples of the N successive frames representing this noise model are retained in memory, so that the spectrum of this noise can be analysed and can serve for the denoising. However, the automatic search for noise continues on the basis of the input signal u(t) so as possibly to find a more recent model which is more suitable either because it represents the environmental noise better, or because the environmental noise has altered. The more recent noise model is entered into memory in place of the previous one, if the comparison with the previous one shows that it is more representative of the environmental noise.

The denoising of the input signal u(t) is done on the basis of the noise model in memory, and more precisely on the basis of the spectral characteristics of this model. A Fourier transform and a mean spectral noise density estimation are then performed on the stored noise model. The denoising operation is preferably carried out by virtue of a Wiener digital filtering, to which we shall return in greater detail. The Wiener filter is parameterized with the spectral characteristics of the noise model recorded and with the spectral characteristics of the signal u(t) to be denoised. The digitized input signal therefore undergoes a Fourier transform and a spectral density estimation. The digital values of the Fourier transform, that is to say the input signal represented by its frequency components, are processed by the Wiener filter and the output from the Wiener filter represents, in the frequency space, the denoised digital signal, that is to say ridded as far as possible of the noise represented by the recorded model.

The filtered digital signal serves either in the reconstruction of an audio signal from which the environmental noise has been partly eliminated, or in voice recognition.

The phase of automatically searching for a noise model and the continuous updating of this model are crucial steps of the process and form more precisely the subject of the invention.

The starting postulates for the automatic formulation of a noise model are the following:

- the noise which one wishes to eliminate is the environmental background noise;
- the environmental noise has energy which is relatively stable in the short term,
- speech is usually preceded by a breathing noise by the pilot which should not be confused with the environmental noise; however, this breathing noise dies out a few hundred milliseconds before the first transmission of speech proper, so that only the environmental noise is encountered just before the transmission of speech;
- and finally, the different noises and the speech are superimposed in terms of signal energy, so that a signal containing speech or a disturbing noise, including breathing into the microphone, necessarily contains more energy than an environmental noise signal.

As a result of this, the following simple hypothesis will be made: the environmental noise is a signal exhibiting minimum short-term stable energy. The expression short-term should be understood to mean a few frames, and in the practical example given hereinafter it will be seen that the number of frames intended for evaluating the stability of the noise is from 5 to 20. The energy must be stable over several frames, failing which it must be assumed that the signal in fact contains speech or some noise other than the environmental noise. It must be a minimum, failing which the signal will be regarded as containing breathing or phonetic speech elements resembling noise but superimposed on the environmental noise.

Figure 2:
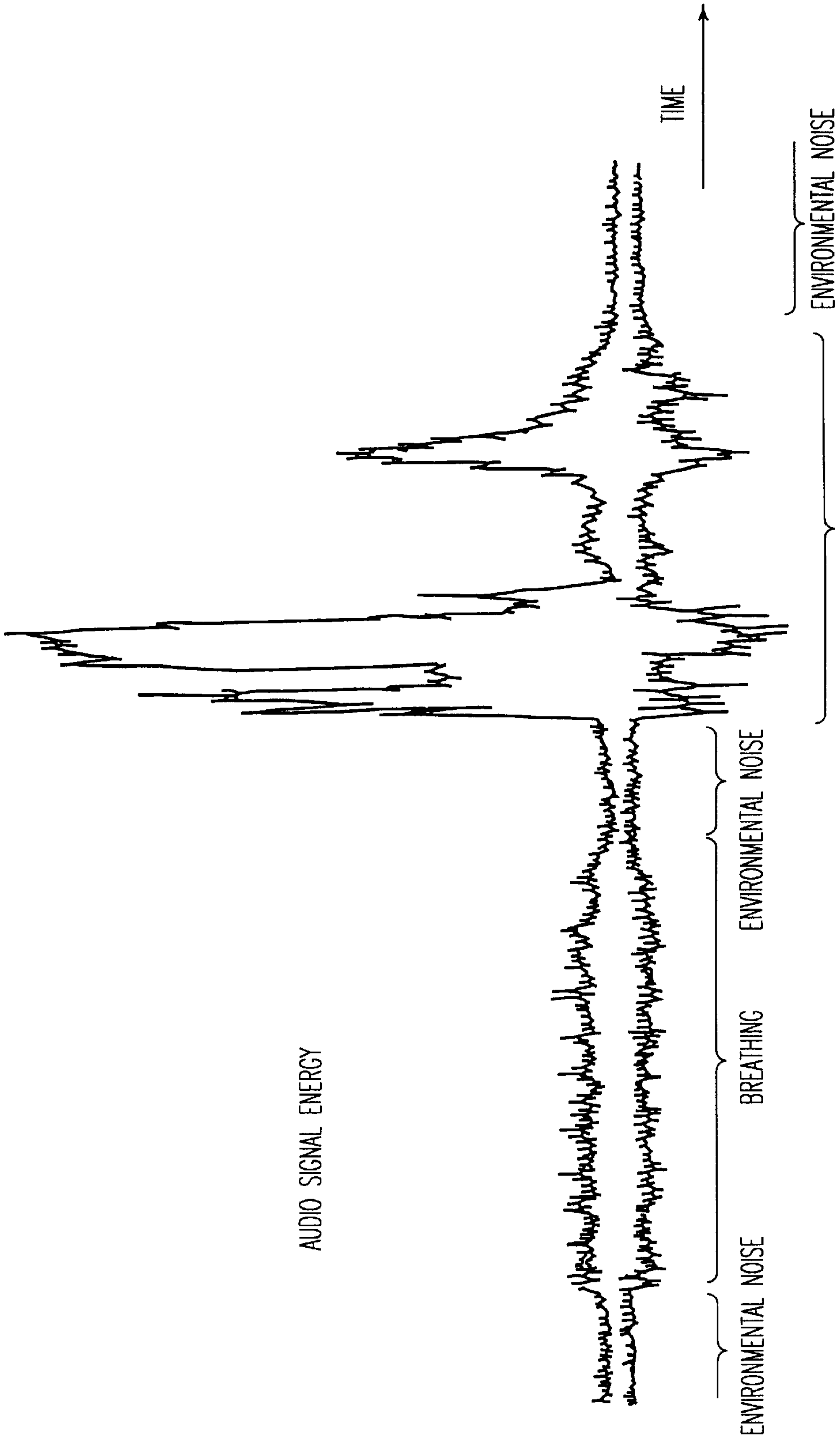
FIG. 2 represents a typical example of a signal emanating from a noisy sound capture.

FIG. 2 represents a typical configuration of temporal alteration of the energy of a microphone signal at the moment of a start of speech transmission, with a phase of breathing noise, which dies out over a few tens to hundreds of milliseconds so as to give way to the environmental noise alone, after which an elevated energy level indicates the presence of speech, reverting finally to the environmental noise.

The automatic searching for environmental noise then consists in finding at least N1 successive frames (for example N1=5) whose energies are close to one another, that is to say the ratio between the signal energy contained in a frame and the signal energy contained in the previous frame or, preferably, previous frames lies within a determined range of values (for example between ⅓ and 3). When such a succession of frames with relatively stable energy has been found, the digital values of all the samples of these N frames are stored. This set of N×P samples constitutes the current noise model. It is used in the denoising. The analysis of the subsequent frames continues. If another succession of at least N1 successive frames meeting the same energy stability conditions (ratios of energies of frames within a determined range) is found, the average energy of this new succession of frames is then compared with the average energy of the stored model, and the latter is replaced by the new succession if the ratio between the average energy of the new succession and the average energy of the stored model is less than a determined replacement threshold which may be 1.5 for example.

From this replacement of a noise model by a more recent model having less energy or not much more energy, it follows that the noise model is locked globally onto the continuous environmental noise. Even before a speech capture, preceded by breathing, there exists a phase where the environmental noise alone is present over a sufficient duration to be able to be taken into account as active noise model. This phase of environmental noise alone after breathing is brief; the number N1 is chosen to be relatively small, so that time is available to readjust the noise model to the environmental noise after the breathing phase.

If the environmental noise alters slowly, the alteration will be taken into account because the threshold for comparison with the stored model is greater than 1. If it alters more rapidly in the increasing direction, the alteration might not be taken into account, so that it is preferable to make provision from time to time for a reinitialization of the search for a noise model. For example, in an aircraft at rest on the ground, the environmental noise will be relatively small and, in the course of the take-off phase, there would be no necessity for the noise model to remain frozen at what it was at rest because a noise model is replaced only by a model having less energy or not much more energy. The reinitialization methods envisaged will be explained further on.

Figure 3:
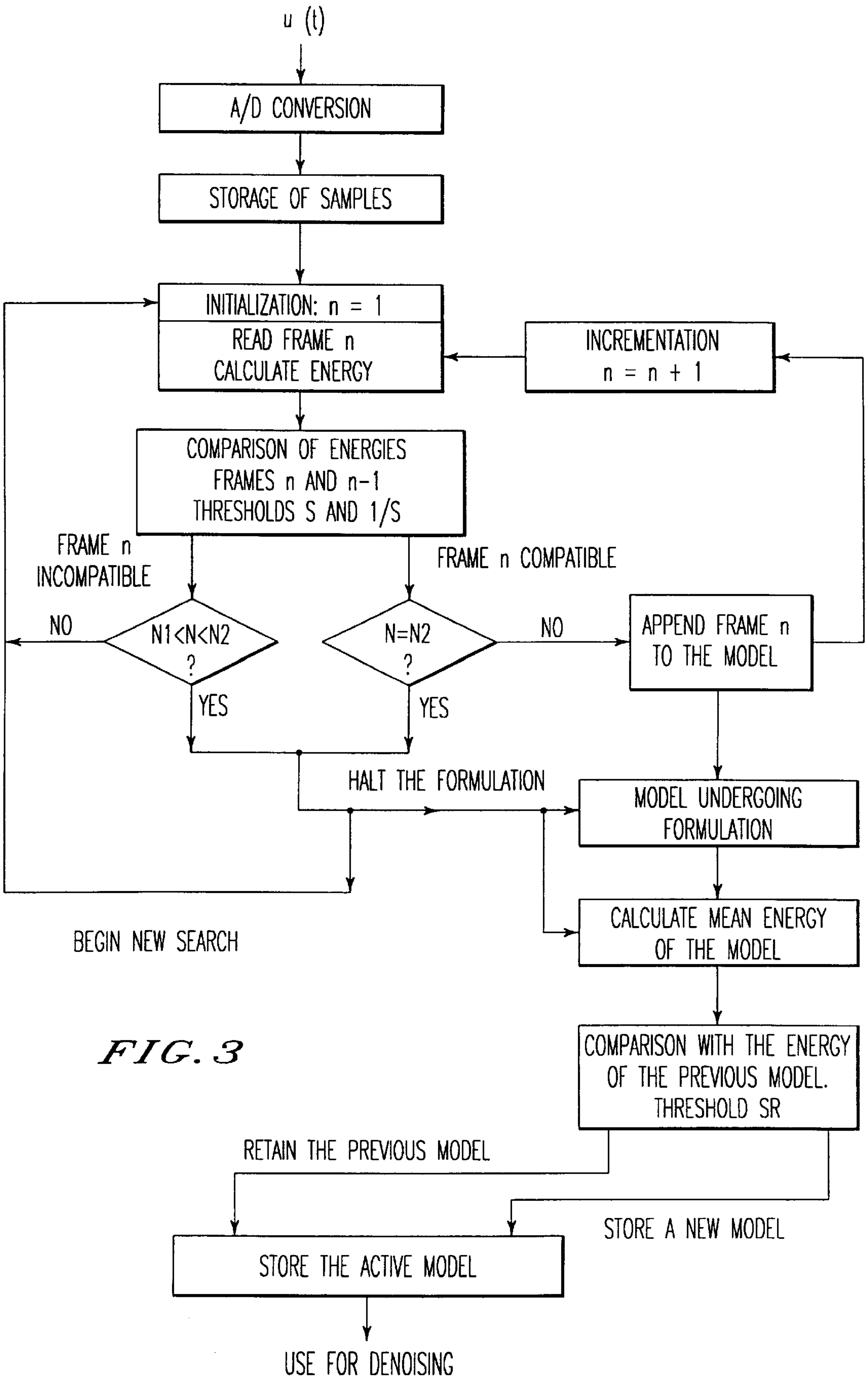
FIG. 3 represents the flowchart of the steps of searching for a noise model in the input signal.

FIG. 3 represents a flowchart of the operations for automatically searching for an environmental noise model.

The input signal u(t), sampled at the frequency $F_e=1/T_e$ and digitized by an analog/digital converter, is stored in a buffer memory capable of storing all the samples of at least 2 frames.

The number of the current frame in a noise model search operation is designated by n and is counted by a counter as the search progresses. On initializing the search, n is set to 1. This number n will be incremented as the formulation of a model of several successive frames progresses. When the current frame n is analysed, the model will by hypothesis already comprise n−1 successive frames meeting the conditions imposed in order to form part of a model.

To begin with, it will be considered that a first model formulation is involved, no other previous model having been constructed. What happens in respect of subsequent formulations will be seen thereafter.

The signal energy of the frame is calculated by summing the squares of the numerical values of the samples of the frame. It is retained in memory.

The next frame of rank n=2 is read thereafter and its energy is calculated in the same way. It is also retained in memory.

The ratio between the energies of the two frames is calculated. If this ratio lies between two thresholds S and S', one of which is greater than 1 and the other less than 1, then the energies of the two frames are regarded as being close and the two frames are regarded as possibly forming part of a noise model. The thresholds S and S' are preferably the inverse of one another (S'=1/S) so that it is sufficient to define one in order to have the other. Nor example, a typical value is S=3, S'=⅓. If the frames may possibly form part of the same noise model, the samples of which they are composed are stored so as to start constructing the model, and the search continues by iteration, incrementing n by one unit.

If the ratio between the energies of the first two frames departs from the imposed interval, the frames are declared incompatible and the search is reinitialized, resetting n to 1.

In the case where the search continues, the rank n of the current frame is incremented, and, in an iterative procedure loop, a calculation of energy of the next frame and a comparison with the energy of the previous frame or of the previous frames are performed, using the thresholds S and S'.

It will be noted in this regard that two types of comparison are possible for appending a frame to n−1 previous frames which have already been regarded as homogeneous energywise: the first type of comparison consists in comparing only the energy of frame n with the energy of frame n−1. The second type consists in comparing the energy of frame n with each of frames 1 to n−1. The second way culminates in greater homogeneity of the model but it has the drawback that it does not take sufficiently good account of cases where the noise level increases or decreases rapidly.

Thus, the energy of the frame of rank n is compared with the energy of the frame of rank n−1 and possibly of other previous frames (though not necessarily all).

If the comparison indicates that there is no homogeneity with the previous frames, because the ratio of the energies does not lie between 1/S and S, two cases are possible:

- either n is less than or equal to a minimum number N1 below which the model cannot be regarded as significant of the environmental noise since the duration of homogeneity is too short; for example N1=5; in this case the model undergoing formulation is abandoned and the search is reinitialized to the beginning by resetting n to 1;
- or n is greater than the minimum number N1. In this case, since a lack of homogeneity is now found, it is considered that there is perhaps a beginning of speech after a phase of homogeneous noise, and all the samples of the n−1 homogeneous noise frames which preceded the lack of homogeneity are retained in the guise of noise model. This model remains stored until a more recent model is found which seems also to represent environmental noise. The search is reinitialized in any event by resetting n to 1.

However, the comparing of frame n with the previous frames could again have culminated in the registering of a frame which is again homogeneous energywise with the previous frame or frames. In this case, either n is less than a second number N2 (for example N2=20) which represents the maximum desired length of the noise model, or else n has become equal to this number N2. Number N2 is chosen in such a way as to limit the calculation time in the subsequent operations of estimating spectral noise density.

If n is less than N2, the homogeneous frame is appended to the previous ones so as to help to construct the noise model, n is incremented and the next frame is analysed.

If n is equal to N2, the frame is also appended to the n−1 previous homogeneous frames and the model of n homogeneous frames is stored so as to serve in the elimination of the noise. The search for a model is moreover reinitialized by resetting n to 1.

The previous steps relate to the first model search. Once a model has been stored however, it can at any moment be replaced by a more recent model.

The replacement condition is again an energy condition, but this time it pertains to the average energy of the model rather than to the energy of each frame.

Accordingly, if a possible model has just been found, with N frames where N1<N<N2, the average energy of this model is calculated, this being the sum of the energies of the N frames, divided by N, and it is compared with the average energy of the N' frames of the previously stored model.

If the ratio between the average energy of the new possible model and the average energy of the model currently in force is less than a replacement threshold SR, the new model is regarded as better and it is stored in place of the previous one. Otherwise, the new model is rejected and the old one remains in force.

The threshold SR is preferably slightly greater than 1.

If the threshold SR were less than or equal to 1, the homogeneous frames having the least energy would be stored each time, this corresponding well to the fact that the environmental noise is regarded as the energy level below which one never drops. However, all possibility of the model altering would be eliminated if the environmental noise were to start increasing.

If the threshold SR were too far above 1, the environmental noise and other disturbing noises (breathing), or even certain phenomena which resemble noise (sibilants or palato-alveolar fricatives for example), might be poorly distinguished. The elimination of noise on the basis of a noise model locked onto breathing or onto sibilants or palato-alveolar fricatives might then impede the intelligibility of the denoised signal.

In a preferred example the threshold SR is around 1.5. Above this threshold the old model will be retained; below this threshold the old model will be replaced by the new. In both cases, the search will be reinitialized by restarting the reading of a first frame of the input signal u(t) and by setting n to 1.

To render the formulation of the noise model more reliable, provision may be made for the search for a model to be disabled if speech transmission is detected in the useful signal. The digital signal processing commonly used in speech detection makes it possible to identify the presence of speech based on the characteristic periodlcity spectra of certain phenomena, especially phenomena corresponding to vowels or to voiced consonants.

The purpose of this disabling is to prevent certain sounds from being taken to be noise whereas they are useful phenomena, to prevent a noise model based on these sounds from being stored and to prevent the suppressing of the noise subsequent to the formulation of the model from then tending to suppress all the similar sounds.

Moreover, it is desirable to make provision from time to time to reinitialize the search for the model so as to allow a reupdating of the model whilst the increases in environmental noise have not been taken into account because SR is not much greater than 1.

The environmental noise can in fact increase considerably and rapidly, for example during the acceleration phase of the engines of an aircraft or of some other air, land or sea vehicle. However, the threshold SR dictates that the previous noise model be retained when the average noise energy increases too quickly.

If it is desired to remedy this situation, it is possible to proceed in various ways, but the simplest way is to reinitialize the model periodically by searching for a new model and by prescribing it to be the active model independently of the comparison between this model and the previously stored model. The periodicity can be based on the average duration of utterance in the application envisaged; for example the durations of utterance are on average a few seconds for the crew of an aircraft, and the reinitialization can take place with a periodicity of a few seconds.

The denoising processing proper, performed on the basis of a stored noise model, can be performed in the following way, by working on the Fourier transforms of the input signal.

The Fourier transform of the input signal is performed frame by frame and supplies, for each frame, P samples in the frequency space, each sample corresponding to a frequency $F_e/i$ with i varying from 1 to P. These P samples will be processed preferably in a Wiener filter. The Wiener filter is a digital filter with P coefficients each corresponding to one of the frequencies $F_e/i$ of the frequency space. Each sample of the input signal in the frequency space is multiplied by the respective coefficient $W_i$ of the filter. The set of P samples thus processed constitutes a denoised signal frame, in the frequency space. For voice recognition applications, direct use is made of these denoised frames in the frequency space. For applications where one wishes to reconstruct a denoised real audio signal, the following are performed in succession: an inverse Fourier transform on each frame, a digital/analog conversion and a smoothing.

The coefficients $W_i$ of the Wiener filter are calculated from the spectral density of the noisy input signal and from the spectral noise density of the stored noise model.

The spectral density of a frame of the input signal is obtained from the Fourier transform of the noisy input signal. For each frequency, we take the squared modulus of the sample supplied by the Fourier transform in order to obtain a value $DS_i$ for each frequency $F_e/i$.

For the spectral density of the noise model, the squared modulus of the P samples is calculated for each frame, and the N squared moduli corresponding to one and the same frequency $F_e/i$ are averaged over the N frames of the noise model. P values of noise density $DB_i$ are obtained.

The Wiener coefficient $W_i$ for the frequency $F_e/i$ is then $W_i=1-DB_i/DS_i$.

The sample of rank i of the Fourier transform of an input signal frame is multiplied by $W_i$ and the succession of the P samples thus multiplied by P Wiener coefficients constitutes the denoised input frame.

The implementation of the process according to the invention can be done using nonspecialized computers, provided with the necessary calculation programs and receiving the digitized signal samples such as they are supplied by an analog/digital converter.

This implementation can also be done using a specialized computer based on digital signal processors, thus allowing a larger number of digital signals to be processed more rapidly.

Figure 4:
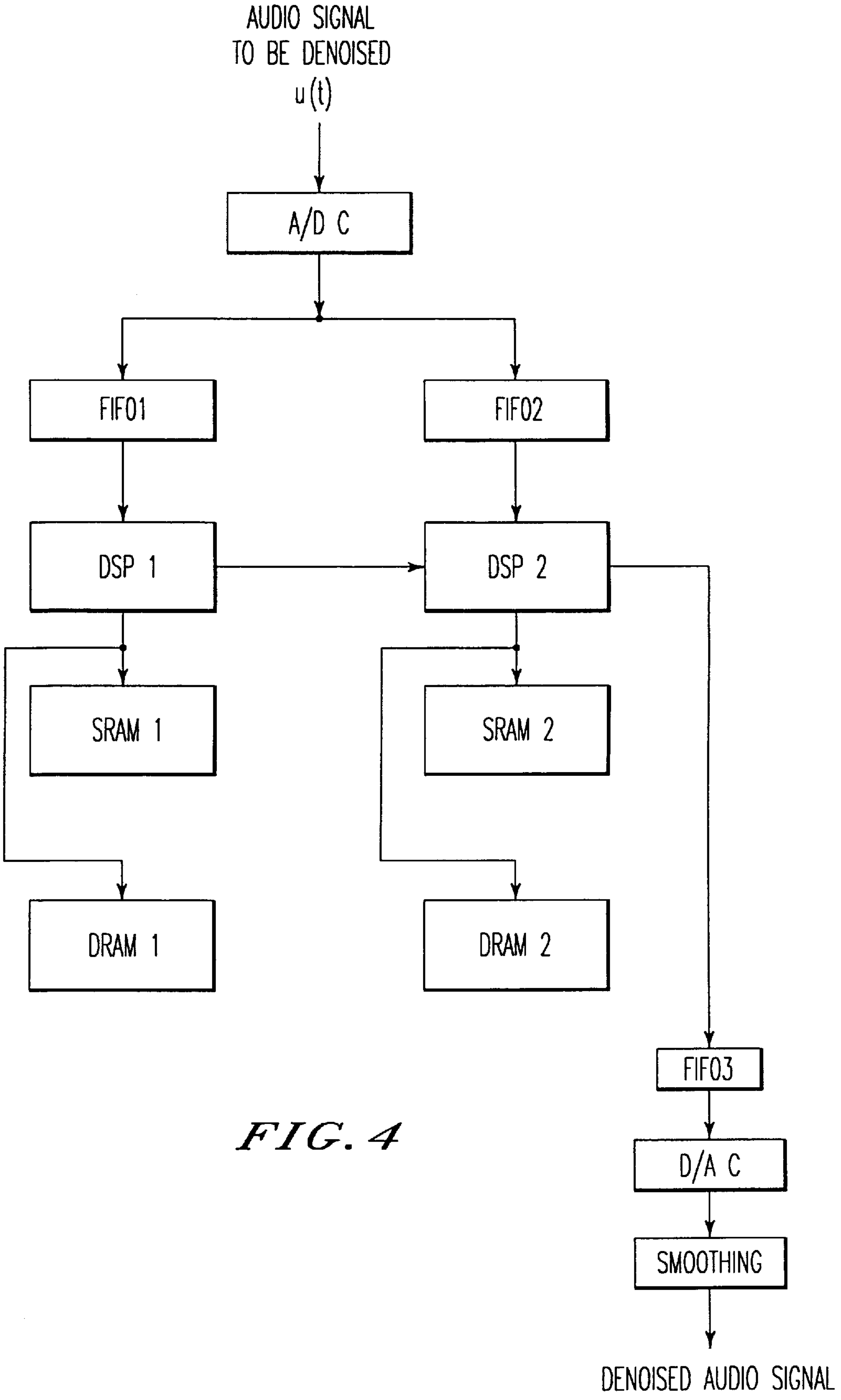
FIG. 4 represents an exemplary architecture of an electronic circuit for implementing denoising operations using the process according to the invention.

FIG. 4 represents an exemplary general architecture of a specialized computer receiving the audio signal to be denoised and supplying in real time a denoised audio signal.

The computer comprises two digital signal processors DSP1 and DSP2 and work memories associated with these processors.

The noisy audio signals pass through an analog/digital converter A/DC and are stored in parallel in two buffer memories FIFO1 and FIFO2 (of the "first-in, first-out" type). One of the memories is linked to the processor DSP1, the other to the processor DSP2.

The processor DSP1 is the master processor and it is dedicated essentially to searching for a noise model. It is therefore programmed so as to execute at least the following operations: calculation of energy of frames, calculations of energy averages, comparison with thresholds, comparison of frame rank with N1 and N2 etc. It also calculates spectral energy densities for the noise model. This processor DSP1 is coupled to a dynamic work memory DRAM1 in which are stored the current-frame sample during a calculation, the energy of a current frame, the energy of the previous frame or frames, the Fourier transform samples of the noise model. It is also coupled to a static work memory in which are stored the tables serving for the calculation of Fourier transforms, and the comparison thresholds S and SR.

The processor DSP2 is dedicated essentially to calculating Fourier transforms of the signal to be denoised, to calculating the spectral density of this signal, to calculating the Wiener coefficients, to Wiener filtering, and to the inverse Fourier transform if the latter has to be performed. The processor DSP2 is coupled to a dynamic work memory DRAM2 and a static work memory SRAM2. The memory DRAM2 stores current-frame samples, Fourier transform calculation results, calculation results for the spectral energy density of the signal, the calculated Wiener coefficients, etc. The memory SRAM2 stores in particular tables serving for the calculation of Fourier transforms.

The denoised audio signal samples calculated by the processor DSP2 are transmitted, through a circulating buffer memory FIFO3, to a digital analog converter D/AC, and to a smoothing circuit which reconstructs the denoised audio signal in analog form.

What is claimed is:

1. A process for automatically searching for noise models in noisy audio input signals, comprising:

digitizing the input signals;

processing the input signals based on an active noise model;

chopping the input signals into successive frames of P samples; and searching for a new noise model in the input signals, by searching for N successive frames having expected characteristics of a noise, storing the N×P corresponding samples so as to construct the new noise model useful in denoising the input signals, and iteratively repeating the search so as to find the new noise model and store the new noise model as a replacement for the active noise model or retain the active noise model according to characteristics of the active noise model and the new noise model, wherein searching for the new noise model comprises, searching for N successive frames whose energies are close to one another, N lying between a minimum value N1 and a maximum value N2, calculating an average energy of the N successive frames, and storing the N×P samples in a guise of a new noise active model if a ratio between the average energy of the new noise model and the average energy of the frames of the active noise model previously stored is less than a determined replacement threshold.

2. The process according to claim 1, wherein searching for N successive frames comprises at least the following iterative steps:

calculating an energy of a current frame of rank n able to be appended to a model undergoing formulation already including n−1 successive frames;

calculating a ratio between the energy of the current frame of rank n and an energy of a previous frame of rank n−1;

comparing the calculated ratio with a low threshold less than 1 and a high threshold greater than 1; and deciding whether to incorporate the frame of rank n into the model undergoing formulation based on a result of the compared calculated ratio.

3. The process according to claim 2, wherein searching for N successive frames further comprises:

calculating a ratio between an energy of a current frame and an energy of one or more other previous frames;

comparing the calculated ratio with the low and high thresholds; and deciding whether to incorporate the current frame into the model undergoing formulation based on a result of the compared calculated ratio.

4. The process according to claim 2, wherein when the frame of rank n is incorporated into the model undergoing formulation:

n is incremented by one unit so as to continue the formulation of the model if n is less than N2, and when n≧N2, the formulation of the model undergoing formulation is halted, an average energy of the n frames is calculated, a ratio between the average energy of the n frames and an average energy of the frames of the actual stored noise model is calculated, the actual noise model is retained or is replaced by the model undergoing formulation according to a value of the ratio, and the iterative search for a new noise model is restarted.

5. The process according to claim 2, wherein when the current frame of rank n is not incorporated into the model undergoing formulation:

the formulation of the model of n−1 frames is halted, if n is greater than N1, a ratio between an average energy of the frames of the model undergoing formulation and the average energy of the frames of the actual stored noise model is calculated, and the actual stored noise model is retained or is replaced by the new noise model according to a value of the ratio, and the iterative search for the new noise model is restarted.

6. The process according to claim 1, wherein a search for a presence of speech is made in the input signals, and searching for the new noise model is disabled if the presence of speech is detected.

7. The process according to claim 1, wherein searching for the new noise model is periodically reinitialized by imposing the new noise model regardless of the respective characteristics of the new noise model and the active noise model.

8. The process according to claim 1, wherein the noisy input signals are processed based on a found noise model, by spectral filtering, to eliminate as far as possible a noise corresponding to the found noise model.

9. The process according to claim 3, wherein when the frame of rank n is incorporated into the model undergoing formulation:

n is incremented by one unit so as to continue the formulation of the model if n is less than N2, when n≧N2, the formulation of the model is halted, an average energy of the n frames is calculated, the ratio between the energy of the n frames and the average energy of the frames of the actual stored noise model is retained or is replaced by the model undergoing formulation according to a value of the ratio, and the iterative search for the new noise model is restarted.

10. The process according to claim 3, wherein when the current frame of rank n is not incorporated into the model undergoing formulation:

the formulation of the model of n−1 frames is halted, if n is greater than N1, the ratio between the average energy of the frames of the model undergoing formulation and the average energy of the frames of the actual stored noise model is calculated, and the actual stored noise model is retained or is replaced by the new noise model according to the value of the ratio, and the iterative search for the new model is restarted.

11. The process according to claim 2, wherein a search for a presence of speech is made in the input signals, and searching for the new noise model is disabled if the presence of speech is detected.

12. The process according to claim 2, wherein searching for the new noise model is periodically reinitialized by imposing the new noise model regardless of the respective characteristics of the new noise model and of the active noise model.

13. The process according to claim 2, wherein the noisy input signals are processed based on a found noise model, by spectral filtering, to eliminate as far as possible a noise corresponding to the found noise model.

14. The process according to claim 3, wherein a search for a presence of speech is made in the input signals, and searching for the new noise model is disabled if the presence of speech is detected.

15. The process according to claim 3, wherein searching for the new noise model is periodically reinitialized by imposing the new noise model regardless of the respective characteristics of the new noise model and of the active noise model.

16. The process according to claim 3, wherein the noisy input signals are processed based on a found noise model, by spectral filtering, to eliminate as far as possible a noise corresponding to the found noise model.

* * * * *